United States Patent
Meier et al.

(10) Patent No.: US 8,582,614 B2
(45) Date of Patent: Nov. 12, 2013

(54) LASER AMPLIFICATION SYSTEM AND METHOD FOR GENERATING RETRIEVABLE LASER PULSES

(75) Inventors: Joachim Meier, Dornbirn (AT); Maximilian Josef Lederer, Hamburg (DE)

(73) Assignee: High Q Laser GmbH, Rankweil (AT)

( * ) Notice: Subject to any disclaimer, the term of this patent is extended or adjusted under 35 U.S.C. 154(b) by 0 days.

(21) Appl. No.: 13/576,375

(22) PCT Filed: Feb. 15, 2011

(86) PCT No.: PCT/EP2011/052179
§ 371 (c)(1),
(2), (4) Date: Jul. 31, 2012

(87) PCT Pub. No.: WO2011/101329
PCT Pub. Date: Aug. 25, 2011

(65) Prior Publication Data
US 2012/0300799 A1    Nov. 29, 2012

(30) Foreign Application Priority Data
Feb. 17, 2010   (EP) .................................... 10153819

(51) Int. Cl.
*H01S 3/10*    (2006.01)

(52) U.S. Cl.
USPC .......................................................... 372/25

(58) Field of Classification Search
USPC .................................................... 372/38.01
See application file for complete search history.

(56) References Cited

U.S. PATENT DOCUMENTS

| | | | |
|---|---|---|---|
| 7,486,704 B2 * | 2/2009 | Kaplan et al. | 372/13 |
| 7,924,902 B2 | 4/2011 | Kopf et al. | |
| 8,064,489 B2 | 11/2011 | Falcoz | |
| 2005/0074038 A1 | 4/2005 | Khaydarov | |
| 2005/0078718 A1 | 4/2005 | Spinelli et al. | |
| 2006/0274403 A1 | 12/2006 | Kaplan et al. | |

FOREIGN PATENT DOCUMENTS

| | | |
|---|---|---|
| FR | 2 852 155 A1 | 9/2004 |
| WO | 02/065202 A1 | 8/2002 |
| WO | 2005/053118 A1 | 6/2005 |
| WO | 2008/006863 A1 | 1/2008 |

OTHER PUBLICATIONS

International Preliminary Report on Patentability for priority International Patent Application No. PCT/EP2011/052179 issued Aug. 21, 2012.

(Continued)

*Primary Examiner* — Jessica Stultz
*Assistant Examiner* — Tuan Nguyen
(74) *Attorney, Agent, or Firm* — Maschoff Brennan (57) ABSTRACT

The invention relates to a laser amplification system for generating retrievable laser pulses having at least one laser source, in particular with a pulse selector arranged downstream thereof for the targeted selection of amplifiable laser pulses, a laser medium for amplifying laser pulses generated by the laser source and a loss modulator, wherein the loss modulator is arranged and connected such that said modulator modulates the amplification of the laser pulses by the laser medium by loss generation so that the retrievable laser pulses are provided with a predefined pulse time and/or pulse energy. Before an amplification process for one of the laser pulses, the current amplification of the laser medium is determined and the loss generation is controlled by the loss modulator depending on the current amplification of the laser medium.

22 Claims, 10 Drawing Sheets

(56) References Cited

OTHER PUBLICATIONS

Gruetzmacher et al., "Few-cycle mid-infrared pulse generation, characterization, and coherent propagation in optically dense media", Review of Scientific Instruments, vol. 73, No. 6, Jun. 2002, pp. 2227-2236.

Oksenhendler et al., "Intracavity acousto-optic programmable gain control for ultra-wide-band regenerative amplifiers", Applied Physics B, Lasers and Optics, vol. 83, Issue 4, May 5, 2006, pp. 491-494.

Jabczynski et al., "Acousto-optically Q-switched and mode locked diode pumped Nd:YV04 laser", Proceedings of the SPIE, vol. 6100, 2006.

Fujimoto et al., "Programmable shaping of a subterawatt, femtosecond laser pulse by modulating the spectral phase of the preamplified pulse", Optics Communications, vol. 280, Issue 2, Oct. 25, 2007 p. 404-407.

Oksenhendler et al., "Ultrawideband regenerative amplifiers via intracavity Acousto-Optic Programmable Gain Control", Conference on Lasers and Electro-Optics and 2006 Quantum Electronics and Laser Science Conference. CLEO/QELS 2006, IEEE, May 21, 2006, pp. 1-2.

European Search Report dated Jul. 29, 2010 as received in application No. 10 15 3819.

White et al., "An ultra low jitter synchronized laser-pulse generator", Optics Communications, vol. 43, Issue 1, p. 53-58, Sep. 1982.

Shimizu et al., "Absolute frequency synthesis of pulsed coherent light waves through phase-modulation active optical feedback", Optics Letters, vol. 21, Issue 22, pp. 1824-1826 (1996).

Figueira et al., "Performance and characterization of a 2.8-TW Ti:sapphire-Nd:glass chirped pulse amplification laser system", Proceedings of SPIE , vol. 5777 (1) SPIE—Mar. 23, 2005.

* cited by examiner

LASER AMPLIFICATION SYSTEM AND METHOD FOR GENERATING RETRIEVABLE LASER PULSES

FIELD OF THE INVENTION

The invention relates to a laser amplification system and a laser amplification method for generating retrievable laser pulses having a predefined pulse time and/or pulse energy.

BACKGROUND

High intensities of laser pulses are required for many applications, such as e.g. in biomedicine or material processing. With good beam quality ($M^2<1.2$) and pico- or femtosecond pulses, this generally means pulse energies in the range of 1-10 µJ in order to exceed the typical ablation or processing threshold energy densities and to allow efficient process control.

The pulsed laser systems used for such applications, more particularly for industrial applications, which are often embodied as recoverable or regenerative amplifiers, increasingly require the ability to be able to provide laser pulses on demand. This is indeed a feature already integrated as standard for typical lasers of the nanosecond class, i.e. having characteristic pulse durations in the range of a few to a few tens of nanoseconds. With the maturation of applications which can advantageously or solely be operated specifically with ultrashort pulses, i.e. with pulse durations in the range of a few to a few tens of pico- and femtoseconds, in the future "pulse-on-demand" operation will become an indispensable feature for these lasers, too. This ability means the retrievability of pulses having predefined desired energies and/or desired pulse durations as necessary or depending on the presently needed requirements. Typical requirements, which exist nowadays especially in industrial application, are for example a. The setting of repetition rate and pulse energy during processing. These are usually not very time-critical in current systems in the prior art and can be assumed to be adiabatic with respect to the system time constants of the laser.
b. The start of a pulse train with a specific repetition rate and pulse energy with TTL signal, wherein the switching edge has to lie between two pulses of the amplified pulse train.
c. The pulse energy boost of the first pulses is intended to be small, e.g. <10% of the target value of the pulse energy. Depending on the process, even higher energy boosts can be accepted, but in some processes only minimal or else no deviations whatsoever are permissible.
d. Finally, applications are increasingly becoming known in which settings of pulse repetition rate and pulse energy can or have to be formed continuously, e.g. from zero up to the maximum value of the repetition rate ($0-f_{max}$), and in a time-critical manner, i.e. with fast setting times, e.g. <1 µs.

The last two points c. and d. represent the critical requirements and cannot be achieved in ultrashort pulse laser systems in the prior art. Admittedly there are technical solutions with which very good time resolution and thus "on-demand" operation or retrievability of pulses can be achieved. This is typically realized with highly repetitive oscillators, a downstream pulse selector, followed by one or more linear post-amplifiers. However, the very high gain results in an energy boost (transient processes) during switch-on or state changes in the repetition rate of the pulse selector. These are far above the values regarded as permissible.

As minimum requirements to be realized for such laser systems with pulses retrievable according to demand and having a predefined duration, temporal separation (repetition rate) and energy, the following thresholds can be specified.

1. The pulse energy boost of the first pulses after the beginning of a pulse burst is intended to be only small, which typically means a deviation of <<10% from the target value of the pulse energy.
2. The pulse repetition rate and pulse energy are intended to be able to be varied continuously from zero up to the respective maximum value and moreover in a time-critical manner, i.e. with time scales <<1 µs.

The prior art discloses various approaches which involve measuring the output signal or the coupled-out laser pulse. A loss modulation of the laser pulse to be amplified can then be effected on the basis of this signal. However, these approaches thus presuppose the generation of a pulse and therefore take effect only for the subsequent pulses, such that immediate and instantaneous influencing of the retrievable pulse to be amplified does not take place.

Consequently, it is an object of the present invention to provide an improved laser system and a corresponding method for generating retrievable laser pulses having a predefined pulse duration and/or pulse energy.

It is a further object to provide such a laser system which is designed such that the system is controlled by open-loop or closed-loop control such that even in the first retrieved pulses only a small pulse energy boost occurs and continuously and instantaneously variable pulse repetition rates and pulse energies are made possible.

SUMMARY

The invention is based on the use of a loss modulator in a laser amplification system for providing retrievable laser pulses. The laser pulses are generated by a laser source and amplified by a downstream gain medium, wherein the amplification is configured such that it can be influenced by the loss modulator, with the result that the retrievable laser pulses can be provided with a predefined pulse time or pulse energy. According to the invention before an amplification process for one of the laser pulses the present state of the laser medium that is relevant to said process is determined. The parameter to be taken into consideration in this case is the respectively given instantaneous gain of the laser medium, from the knowledge of which the loss generation by the loss modulator is controlled by closed-loop or open-loop control. The influencing of the respective next pulse to be amplified by the loss modulation is thus based on the knowledge of the present or historical state of the amplifying system.

By determining the gain or the gain factor before a pulse pass through the laser medium, it is thus possible to adapt the subsequent amplification process ex ante and near-instantaneously, such that, firstly, laser pulses that are adapted well to the requirements are provided. Secondly, this adaptation takes place without delay since it is not necessary to measure the output signal for closed-loop control only after an amplification process.

Such an adaptation of the loss modulation can be effected by the direct measurement of the state of the laser medium, e.g. by measurement of the fluorescence or of the saturation state. This variable embodies the amplification effect to be expected in the subsequent pass of the laser pulse, such that the input characteristic of the laser pulse can be adapted to the expected amplification behavior by the loss modulation depending on the desired parameters, such as e.g. pulse duration and pulse energy. The measured fluorescence represents the saturation of the laser medium and thus also the past amplification processes and the temporal changes in the medium.

Accordingly, as an alternative or else in addition to the direct measurement, a model-based open-loop control can be effected, by means of which the state of the laser medium and the behavior thereof are mapped and thus forecast. In such modeling, in addition to the laser medium itself, further influences, such as e.g. losses owing to components of a laser resonator, can also be taken into account in this case. The model parameters can in this case be updated by measurement of input and output signals or other amplification-relevant variables, such as e.g. the fluorescence or the saturation state, and the model can thus be adapted at certain time intervals or else continuously and constantly.

The exact position of the loss modulator and of the sensors for measuring the variables respectively describing the amplification process or the amplification capability of the laser medium are in this case dependent on the arrangement specifically chosen.

One typical example of a pulse amplification device is the arrangement according to the principle of the recoverable amplifier. Such an arrangement is known from EP 1 687 876, for example, in which, within the resonator, a loss modulation is effected with the time scale of the pulse generation. As a further component, it contains a sufficiently fast loss modulator. This modulator can be an acousto-optical modulator, an electro-optical modulator or some other equivalent suitable component. With the aid of this fast modulator, the resonator loss of the amplifier, depending on pulse requirement, e.g. of point in time and energy, is controlled by closed-loop or open-loop control according to the invention such that laser pulses having the required pulse duration and pulse energy are provided in a retrievable manner. By way of example, a signal corresponding to the amplifier fluorescence, and thus to the amplification, can be used as a feedback signal for a closed-loop control. The open-loop control can be effected, for example, on the analytical or empirical modeling of the resonator behavior or alternatively using look-up tables having values describing the resonator behavior.

In addition to the regenerative amplifier with a fast loss modulator, such a laser amplification system can contain, in the standard exemplary embodiment, a seed oscillator, open-loop/closed-loop control electronics and, if appropriate, further optional components such as a further pulse selection, a pulse compressor and nonlinear conversion stages.

Laser amplification systems according to the invention for generating retrievable laser pulses having a predefined pulse time and/or pulse energy and the underlying laser amplification method according to the invention are described in greater detail purely by way of example below on the basis of exemplary embodiments illustrated schematically in the drawing. In the figures, specifically:

BRIEF DESCRIPTION OF THE DRAWINGS

FIG. 18 shows gain constant and pulse energy for the fifth exemplary embodiment with random timing with closed-loop control according to the invention, and FIG. 19 shows the schematic illustration of a sixth exemplary embodiment of the laser amplification system according to the invention according to the principle of the recoverable amplifier with model-based calculation of the amplification.

DETAILED DESCRIPTION

Figure 1:
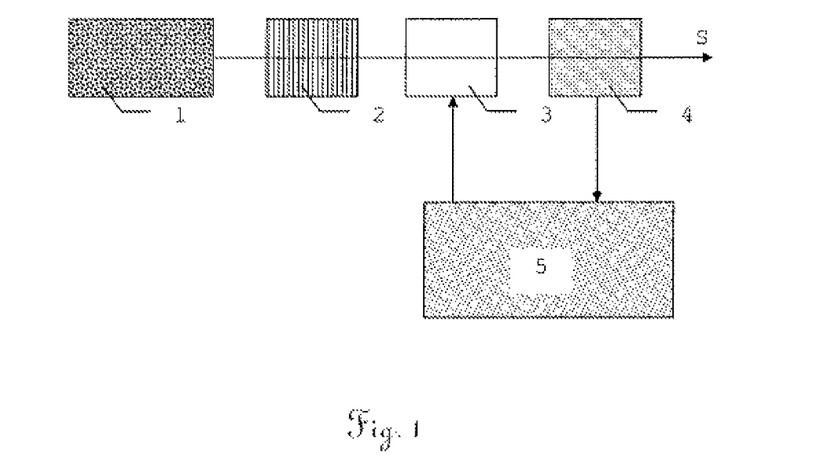
FIG. 1 shows the schematic illustration of a first exemplary embodiment of a laser amplification system according to the invention with monitoring of the fluorescence.

FIG. 1 shows the schematic illustration of a first exemplary embodiment of a laser amplification system according to the invention with monitoring of the fluorescence. In this arrangement, a laser source 1 generates a laser pulse, which is selected by a downstream pulse selector 2 in a targeted manner as laser pulses to be amplified. The laser pulse is passed through a laser medium 4, amplified there and finally coupled out and subsequently used as a retrievable laser pulse S. A loss modulator 3 is disposed upstream of the laser medium 4, wherein the loss modulator 3 is arranged and switched such that it modulates the amplification of the laser pulses by the laser medium 4 by loss generation, such that the retrievable laser pulses S are provided with a predefined pulse time and/or pulse energy.

Before an amplification process for one of the laser pulses the respective instantaneous gain of the laser medium 4 is determined by means of a fluorescence measuring arrangement and the loss generation by the loss modulator 3 is adapted by an open-loop/closed-loop control electronic unit 5 depending on the instantaneous gain of the laser medium 4.

The laser source 1 used can be e.g. a typical laser arrangement for generating pico- or femtosecond pulses having an output power of 0.1 to 10 W, repetition rates of 10 to 100 MHz, pulse lengths of 100 fs to 10 ps and a wavelength of between 700 nm and 1.7 μm. Laser sources having these technical data are obtainable e.g. as Nd:YVO lasers having a pulse duration of 8 to 13 ps or as Yb:KYW lasers having a pulse duration of 100 to 400 fs. However, similar specifications can also be achieved with Ti:sapphire or Cr:LiSAF lasers (wavelength of approximately 800 nm) or by the use of Yb- or Er-doped fiber lasers (wavelengths of 1040 nm or 1550 nm).

Acousto- or electro-optical modulators from the prior art can be used as pulse selector 2 and/or the loss modulator 3, wherein a combination of both functionalities in one modulator can also be realized.

Both "bulk" crystals and fiber amplifiers can be used as the laser medium 4. One example of "bulk" crystals is the use of an Nd:YVO crystal having a length of approximately 30 mm, which is optically pumped by means of a laser diode (100 W, 880 nm). Such an arrangement is suitable for amplifying ps pulses, wherein output powers >50 W can be achieved with pulse energies of >200 μJ.

Realizations with a fiber can use a fiber having a length of >40 cm and having Yb or Er doping, wherein amplifiers of this type can be embodied with "traditional" fibers such as are customary e.g. in telecommunications, or with fibers based on photonic crystals, e.g. based on rod-type fiber technology. The first implementation of a fiber amplifier is a standard technology in telecommunications, where usually pulses with >10 ps are amplified and average powers of <1 W are used, but fiber amplifiers having a power of a few watts and fs pulse duration can also be realized. The second implementation is suitable particularly for amplifying pulse durations of <500 fs and output powers of tens of watts can be realized with Yb-doped rod-type fibers. In both cases, laser diodes having powers of a few watts to a few hundred watts are appropriate as pump source.

Figure 2:
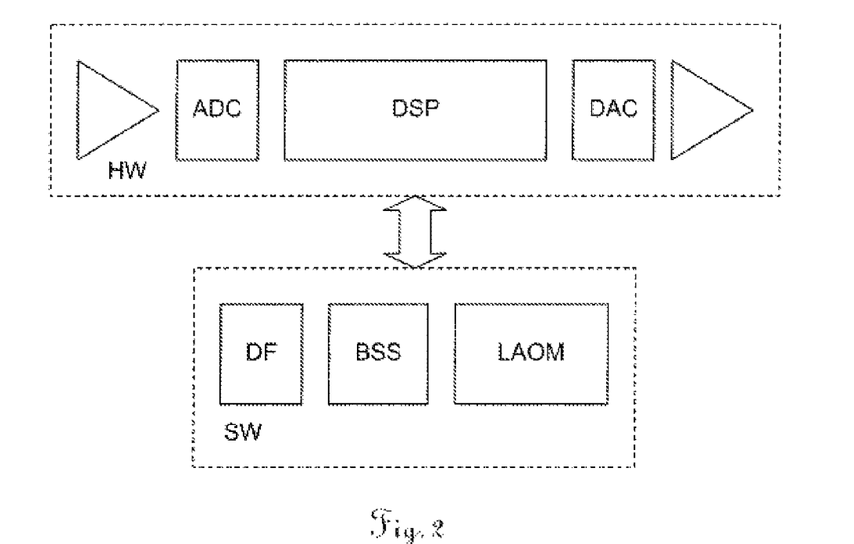
FIG. 2 shows the schematic illustration of hardware and software components for the first exemplary embodiment.

FIG. 2 schematically illustrates hardware and software components of the open-loop/closed-loop control electronic unit 5 as evaluation electronics for the fluorescence measurement of the first exemplary embodiment. The open-loop/closed-loop control electronic unit 5 calculates the necessary input energy in order to achieve a predefined output energy by means of the amplification and loss modulation coordinated therewith. In this case, the requisite measurement of the fluorescence takes place directly at the laser medium 4, i.e.—depending on the embodiment—at the crystal or fiber. For this purpose, a fiber guides the fluorescence from the crystal to a photodiode. The resulting electrical signal is amplified in the hardware arrangement HW, converted into a digital signal by an analog-to-digital converter ADC and processed by a digital signal processor DSP. The software SW filters the signal for noise reduction in a digital filter DF and calculates the actuating signal BSS for the loss modulator, e.g. an acousto-optical modulator. In order to compensate for non-linearities, e.g. those of an AOM characteristic curve, the actuating signal is then linearized. On the hardware side, the calculated digital signal LAOM is, in turn converted into an analog signal by a digital-to-analog converter DAC, subsequently amplified and drives the AOM as loss modulator via an RF driver.

Figure 3:
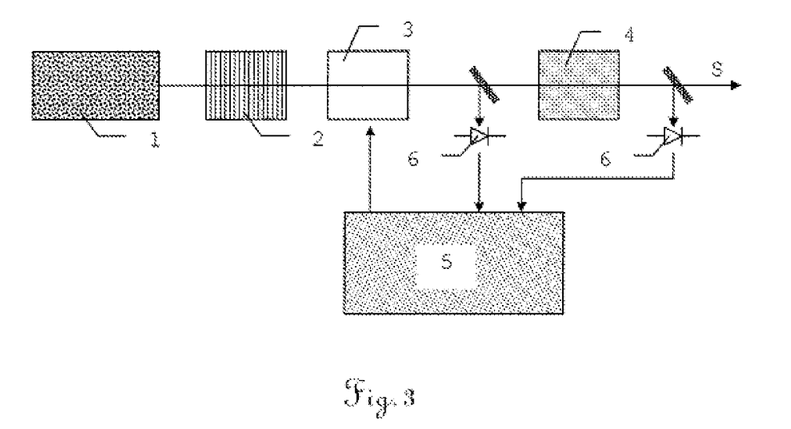
FIG. 3 shows the schematic illustration of a second exemplary embodiment of a laser amplification system according to the invention with model-based calculation of the amplification.

A second exemplary embodiment of a laser amplification system according to the invention with a model-based calculation of the amplification is illustrated schematically in FIG. 3. In a construction that is basically identical in comparison with the first exemplary embodiment, in this embodiment the input energy and output energy are measured measured by two photodiodes 6 disposed upstream and downstream of the laser medium 4. In contrast to the first exemplary embodiment, here the state of the laser medium 4 and the gain factor thereof are numerically modeled and calculated in the open-loop/closed-loop control electronic unit 5. After first calculations on the basis of start values, the model is matched with the actually realized amplifications on the basis of the measured input and output energies.

Figure 4:
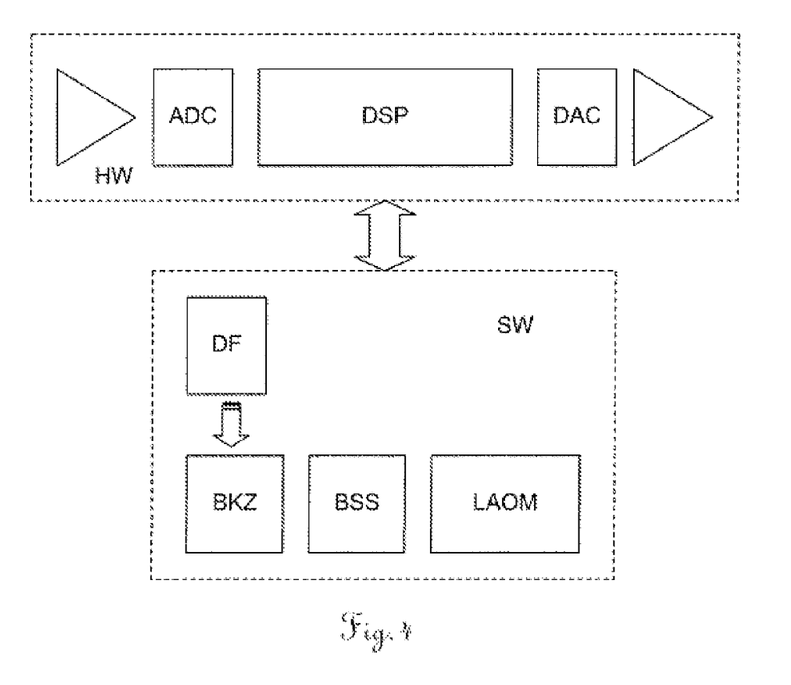
FIG. 4 shows the schematic illustration of hardware and software components for the second exemplary embodiment.

FIG. 4 shows the associated schematic illustration of hardware and software components for the second exemplary embodiment.

In contrast to the first exemplary embodiment, the state of the laser medium 4, more particularly the instantaneous gain factor, is calculated by the open-loop/closed-loop control electronic unit 5. In this context, laser medium is also understood to mean, if appropriate, a plurality of laser crystals used for amplification. In this case, a matching between calculated model and the optical system takes place after each amplification process. With a hardware arrangement HW of the open-loop/closed-loop control electronic unit 5 that is identical in comparison with the first exemplary embodiment, in the software SW a digital filtering DF is followed by the calculation of the crystal state BKZ, from which in turn the actuating signal BSS for the loss modulator is calculated and subsequently linearized.

The calculation of the crystal state BKZ is based on the numerical modeling of the crystal, for which e.g. it is possible to use the two differential equations for the gain factor g and the energy E, wherein the equations for an amplifier arrangement comprising one or more laser crystals arranged in a resonator as laser medium can read as follows $$\frac{dg}{dt} = \frac{g_0 - g}{\tau_L} - \frac{gE}{E_{sat}T_K} \qquad (1) \text{ and } (2)$$

$$\frac{dE}{dt} = \frac{E}{T_R}(g - l_{para} - l_{mod})$$

The first equation describes the inversion and thus the gain of the 4-level system, which is coupled to the extracted laser energy (second equation). Specifically, the following relationships are applicable.

g instantaneous gain or circulation gain constant
$g_0$ small-signal gain constant
$\tau_L$-lifetime of the upper laser level
E pulse energy
$E_{sat}$ saturation energy
$T_R$ resonator circulation time
$l_{para}$ parasitic loss constant
$l_{mod}$ adjustable modulation loss.

At the beginning, the first equation is solved for E=0 and after each amplification process, from input energy and output energy, a matching of the model with the gain factor actually present is carried out.

In principle, however, the model-based calculation of the gain factor can also be supported or supplemented by further measurement variables, such as e.g. a fluorescence measurement.

Figure 5:
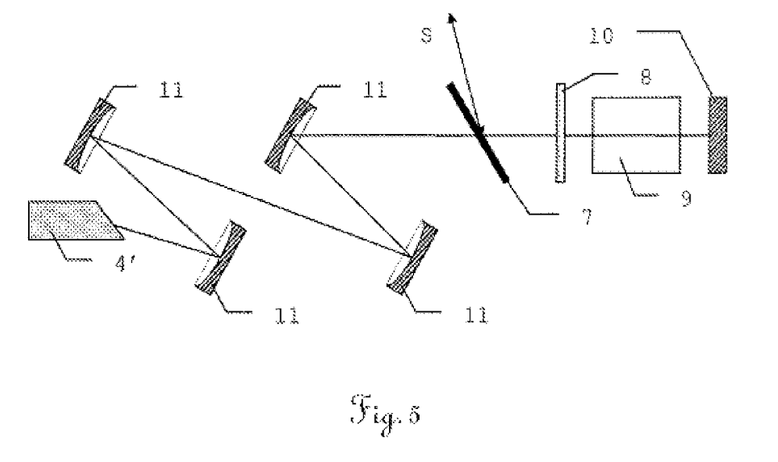
FIG. 5 shows the schematic illustration of a laser amplifier system according to the principle of the recoverable amplifier according to the prior art.

FIG. 5 illustrates, as one application, the cavity with the generic system components of a laser amplification system according to the principle of the recoverable amplifier according to the prior art. A polarized seed laser pulse from a seed laser source is coupled into the arrangement via a polarizer 7 and is reflected by a mirror 10 after passing through an electro-optical switching modulator 9, such as e.g. a Pockels cell, and a quarter-wave plate 8. Depending on the voltage applied to the electro-optical switching modulator 9, the polarization plane of the laser beam is rotated, thus enabling passage through the polarizer 7. By means of a corresponding circuit, therefore, pulses can be both coupled into the arrangement and coupled out as laser pulse S. The electro-optical switching modulator 9 in interaction with the polarizer 7 thus forms an externally controllable switch by which a light pulse can optionally be coupled in and out and the resonator quality factor can be controlled. If a pulse is coupled in and thus trapped within the resonator, it is amplified upon each pass through the laser medium 4', wherein multiple reflections is effected at folding mirrors 11. The laser medium 4' is optically pumped by an external laser diode source (not illustrated here) and can be embodied, for example, as a crystal or else as a fiber, wherein one of the surfaces of the laser medium 4' serves as a resonator mirror in a manner known from the prior art. After a certain number of resonator circulations and passes through the amplifying laser medium 4', the pulse is coupled out as laser pulse S by means of a renewed rotation of the polarization by the switching of the electro-optical switching modulator 9 via the polarizer 7. In this case, in terms of the embodiment and arrangement of the components, this arrangement merely represents one example of a recoverable or regenerative amplifier. In particular, fiber-optic components can also be used for beam guiding.

Figure 6:
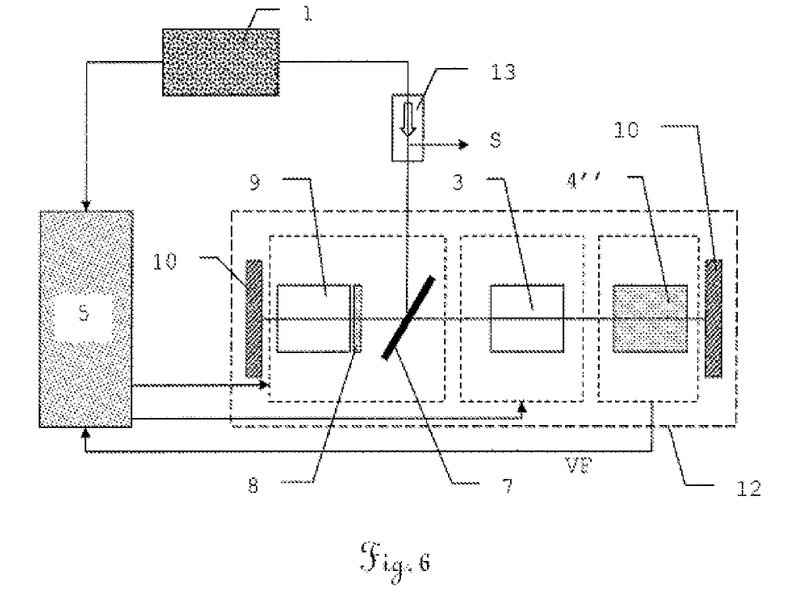
FIG. 6 shows the schematic illustration of a third exemplary embodiment of the laser amplification system according to the invention according to the principle of the recoverable amplifier with monitoring of the fluorescence and as an example of an ultrashort pulse laser system controlled by a laser processing apparatus with scanner.

A third exemplary embodiment of the laser amplification system according to the invention is illustrated in FIG. 6 by way of example for an ultrashort pulse laser system controlled by a laser processing apparatus with scanner.

The laser amplification system according to the invention has a regenerative amplifier 12, comparable in principle to the example of the prior art from FIG. 5, having one or more amplifying laser media 4", a laser resonator having two resonator mirrors 10, a thin-film polarizer as polarizer 7 and a first electro-optical switching modulator 9. According to the invention, at least one second acousto- or electro-optical loss modulator 3 for the open-loop control of the pulse energy loss is arranged within the laser resonator, such that pulse duration and/or pulse energy of the laser pulses S can be altered by active modulation of the resonator loss. In principle, however, it is also possible to use further modulators, i.e. for example a third or fourth modulator or else combinations of modulators. In this case, this modulation of the resonator loss can be effected by open-loop or closed-loop control, for which a multiplicity of approaches are available, in principle, in the prior art. By means of such closed-loop or open-loop control of the resonator loss, laser pulses having a predefined pulse repetition rate and/or pulse energy are provided in a retrievable manner, such that an application-conforming supply with laser pulses S having the desired temporal and energetic characteristic is possible One specific possibility for the closed-loop control of the resonator loss is the use of a signal, VF representing the amplifier fluorescence as a feedback signal. The open-loop control of the resonator loss can be effected, for example, by means of a look-up table.

Further components are a seed oscillator as laser source 1 for providing the pulses to be amplified, an open-loop/closed-loop control electronic unit 5 for the first and the second modulator 3, 9 and an optical isolator 13 for isolating and coupling out the retrievable laser pulses S as emission to be used.

Figure 7:
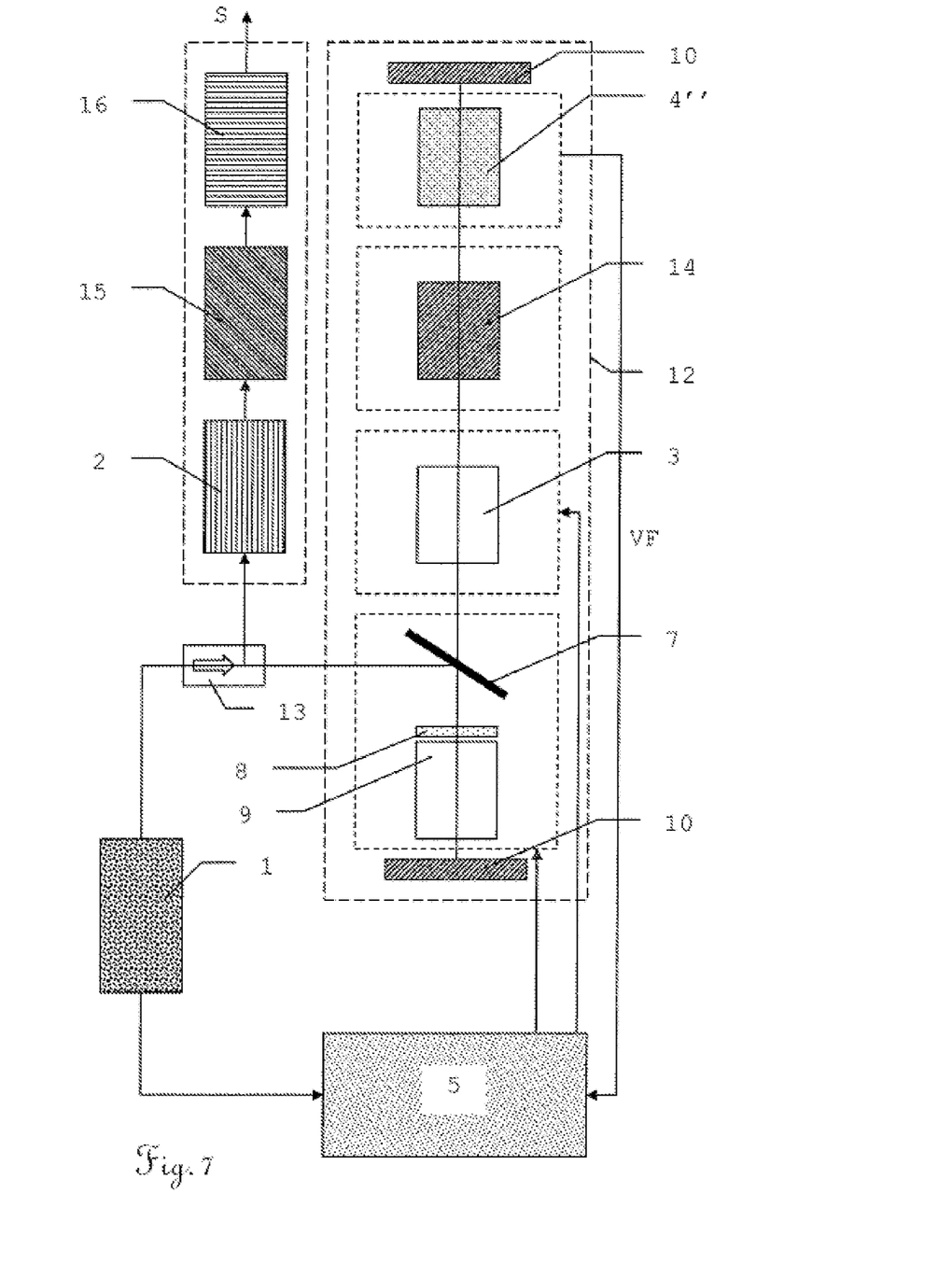
FIG. 7 shows the schematic illustration of a fourth exemplary embodiment of the laser amplification system according to the invention according to the principle of the recoverable amplifier with monitoring of the fluorescence and with further components for generating higher harmonics.

A fourth exemplary embodiment of the laser amplification system according to the invention with further components for generating higher harmonics is elucidated in FIG. 7. In this case, the basic construction corresponds to the third exemplary embodiment from FIG. 6, but a pulse stretcher 14 is arranged within the laser resonator and a pulse compressor 15 is arranged outside the laser resonator, which make possible a chirped pulse amplification according to otherwise known methods from the prior art, such as are known from EP 1 687 876, for example. Through suitable configuration of the pulse compressor 15, it is possible to lengthen the pulse length relative to the seed pulse. In principle, however, the pulse stretcher can also be arranged elsewhere, in particular also outside the laser resonator.

For targeted selection and for retrieval of the laser pulses S, there is disposed downstream of the isolator 13 a pulse picker or pulse selector 2, which is followed, in this exemplary embodiment, by nonlinear conversion stages 16 for generating the second and/or higher harmonics.

As an example of the operation of a regenerative amplifier loss-controlled by closed-loop control, the numerical simulations show how a change in the repetition rate, for example, affects an amplifier not controlled by closed-loop control and, in comparison therewith, an amplifier controlled by closed-loop control. The simulated system contains four laser crystals as laser medium or gain media and was designed such that amplifier powers of 100 W or higher can be achieved with repetition rates of 100-3000 kHz. In order to illustrate the situation in the regenerative amplifier with loss modulation, equations (1) and (2) are analyzed and numerically integrated.

Figure 8:
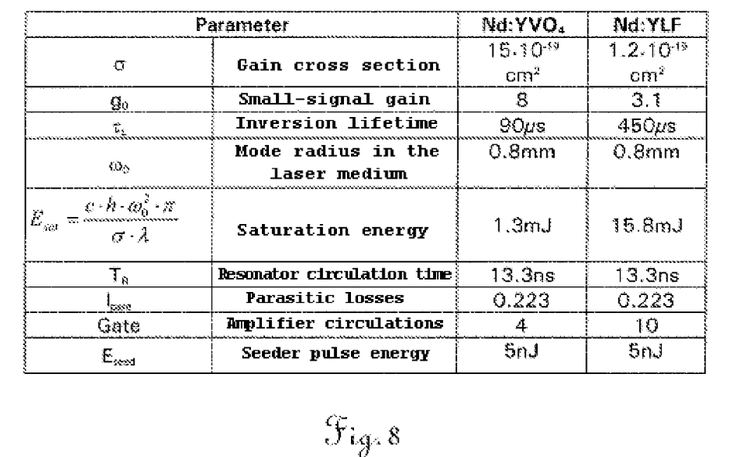
FIG. 8 shows the overview of parameters for the fourth and a fifth exemplary embodiment of laser amplification systems according to the invention.

The following FIGS. 8-18 show simulations for illustrating the efficiency of the closed-loop control for two systems with the laser media Nd:YVO$_4$ and Nd:YLF each having four laser crystals, wherein the relevant simulation parameters are indicated in the form of an overview in FIG. 8.

Figure 9:
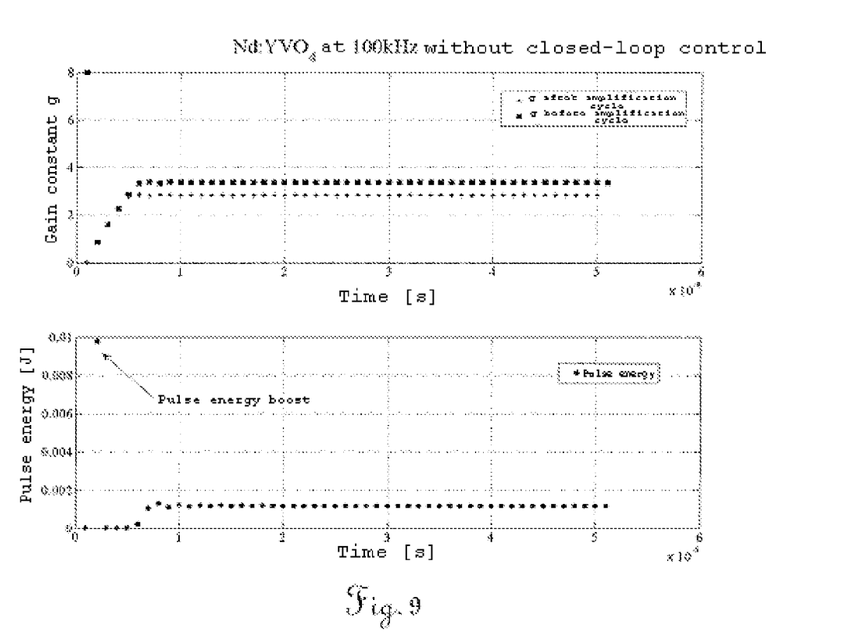
FIG. 9 shows gain constant and pulse energy for the fourth exemplary embodiment at 100 kHz without closed-loop control according to the invention.
Figure 10:
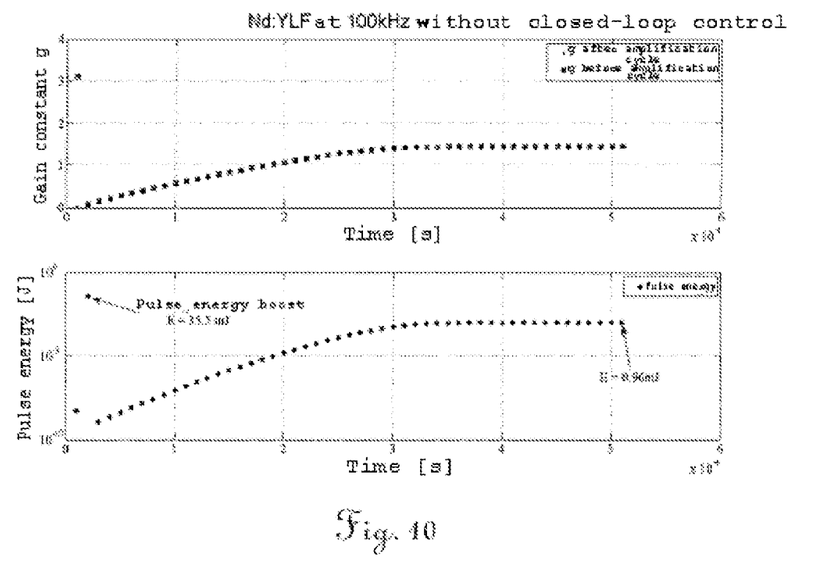
FIG. 10 shows gain constant and pulse energy for the fifth exemplary embodiment at 100 kHz without closed-loop control according to the invention.

FIGS. 9 and 10 respectively show the pulse energy E and the circulation gain constant g for an Nd:YVO$_4$ and an Nd:YLF regenerative amplifier at a repetition rate of 100 kHz. These simulations serve for illustrating the dynamic relationships, wherein the loss modulation was deactivated. The parasitic loss constants in both simulations were 0.223, which corresponds to a loss of 20%.

The initial pulse energy boost and the time for attaining the settled state can clearly be seen. The pulse boost is 10-fold in the case of Nd:YVO$_4$, and it is 35-fold in the case of Nd:YLF on account of the longer lifetime in the upper laser level and the smaller gain gross section. Not only for the application but also for the amplifier itself, such high pulse energies are generally unacceptable and are typically kept below 1 mJ in order to avoid nonlinearities.

Furthermore, it can be discerned that the difference between the gain constant g before and after an amplification cycle is relatively small, and therefore so is the change in g during the amplification. Given an extracted pulse energy of approximately 1 mJ, this corresponds to <10% in the case of Nd:YVO$_4$ and approximately 1% in the case of Nd:YLF.

Equation (2) shows that the latter is decoupled from equation (1) if, on account of the only slight change in g during the amplification process, g is regarded as constant to a first approximation. A condition for constant output energy of the amplifier can then be formulated simply as follows:

$$g - l_{para} - l_{mod} = \kappa = \text{const.} \quad (3)$$

In this case, the parameter κ plays the part of a desired variable for the pulse energy which is predefined for the system. At the same time, before each amplification process, the instantaneous gain g is measured, which can be realized e.g. by means of the measurement of the fluorescence of the amplifier using a photodiode. Finally, the resonator-internal loss modulator $l_{mod}$ is then set or controlled by open-loop or closed-loop control such that equation (3) is fulfilled and the amplifier thus produces the energy corresponding to the desired value κ. In the case of the closed-loop control to a constant amplifier pulse energy, this is done e.g. without any change in the amplification time or gate length, pump condition and seeder pulse energy, only by means of the measurement of the gain g and the setting of the resonator loss $l_{mod}$ (e.g. by means of AOM or EOM). The amplifier can then also be triggered aperiodically in any desired fashion.

The following points should be taken into consideration in this case.

The pulse energy corresponding to the desired value κ can be maintained by the closed-loop control only when the interrogated repetition rate is less than or equal to the rate at which the settled amplifier can produce this energy ($l_{mod}$=0). However, bursts with a higher pulse rate can also be generated.

Since the closed-loop control is substantially based on a negligible gain saturation by the individual pulse, its quality factor will be ensured only in the case of small changes Δg in the gain which are caused by the amplification process.

Figure 11:
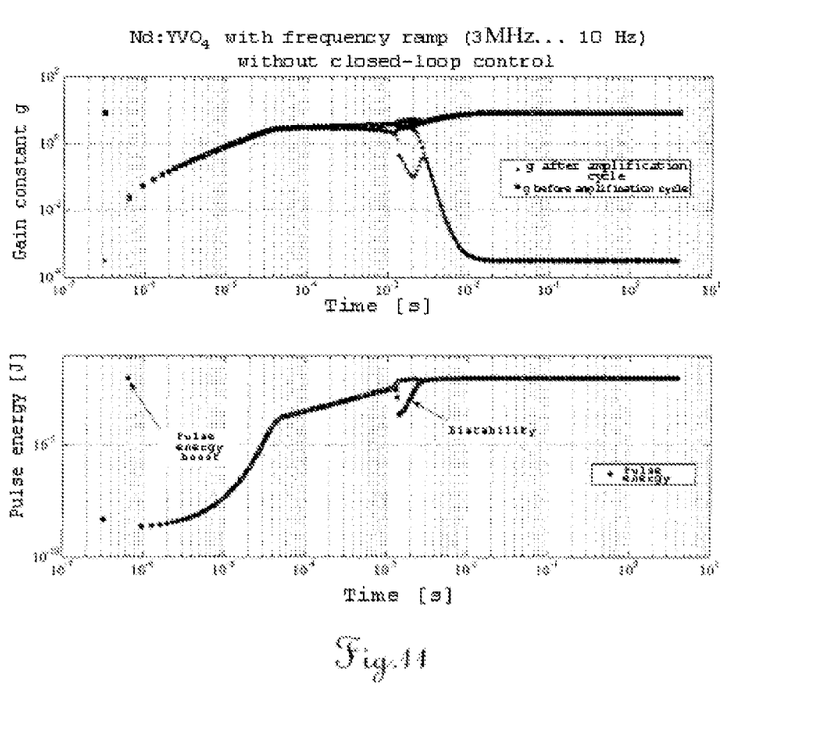
FIG. 11 shows gain constant and pulse energy for the fourth exemplary embodiment upon passing through a frequency ramp without closed-loop control according to the invention.
Figure 12:
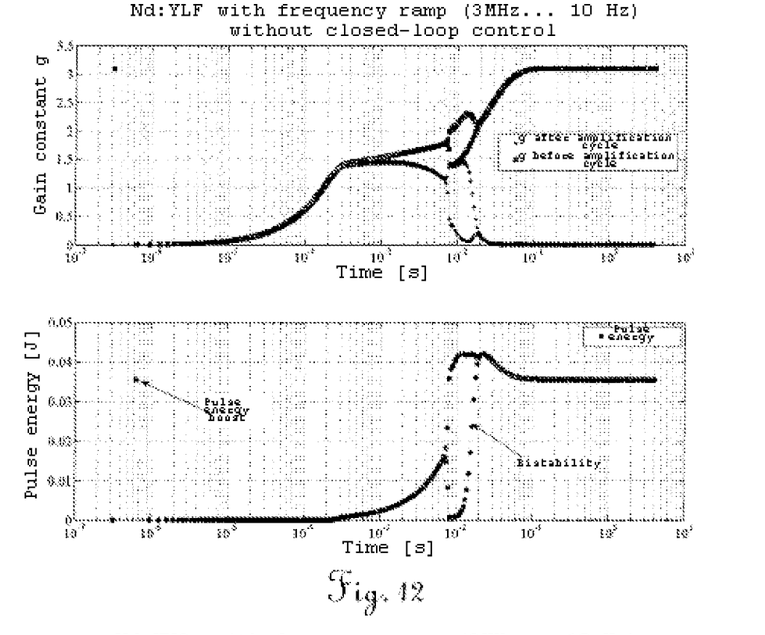
FIG. 12 shows gain constant and pulse energy for the fifth exemplary embodiment upon passing through a frequency ramp without closed-loop control according to the invention.

FIG. 11 and FIG. 12 show gain constant and pulse energy for the fourth and fifth examples of an amplifier system when passing through a frequency ramp without closed-loop control according to the invention. In this case, a change in frequency from 3 MHz to 10 Hz takes place within approximately 4 s.

As is clearly evident, as a result of the frequency tuning the amplifier not only experiences a significant change in pulse energy, but regions of bistability also arise. The initial pulse boost is also provided.

Figure 13:
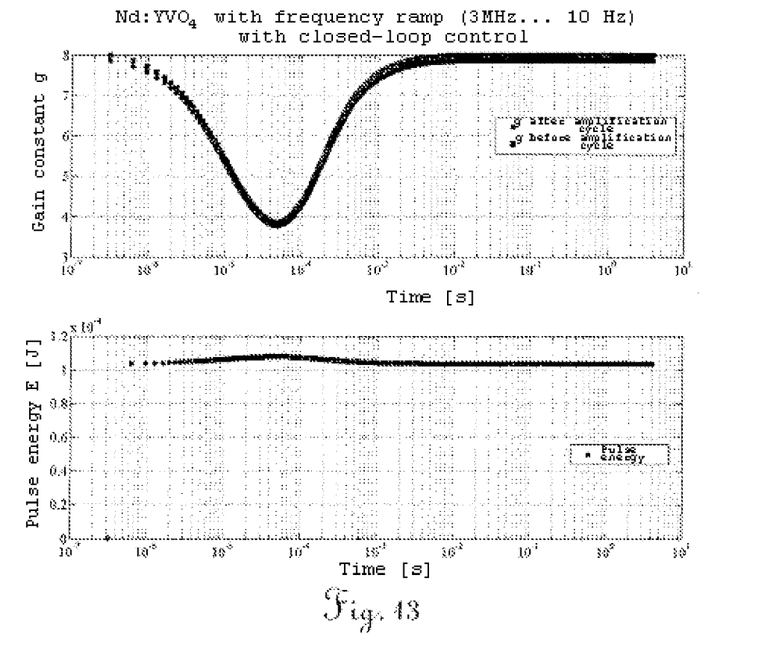
FIG. 13 shows gain constant and pulse energy for the fourth exemplary embodiment upon passing through a frequency ramp with closed-loop control according to the invention.
Figure 14:
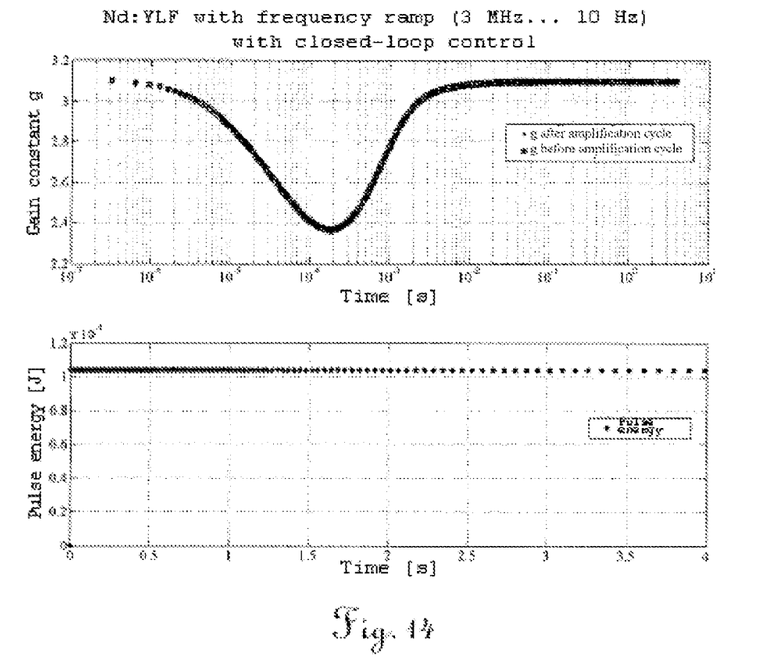
FIG. 14 shows gain constant and pulse energy for the fifth exemplary embodiment upon passing through a frequency ramp with closed-loop control according to the invention.

FIG. 13 and FIG. 14 illustrate gain constant and pulse energy for the fourth and fifth examples of an amplifier system when passing through the same frequency ramp with closed-loop control according to the invention.

The set energy of approximately 100 μJ is maintained very well by the closed-loop control. Only in the case of Nd:YVO$_4$ does a slight deviation of <5% arise. Since the extractable power in this amplifier is approximately 100 W, the pulse energy at the start of the frequency ramp, i.e. at 3 MHz, does not correspond to the energy for the settled state of the amplifier. However, the energy can be maintained by the closed-loop control until the frequency falls to <1 MHz. The initial pulse energy boost can also be corrected.

Figure 15:
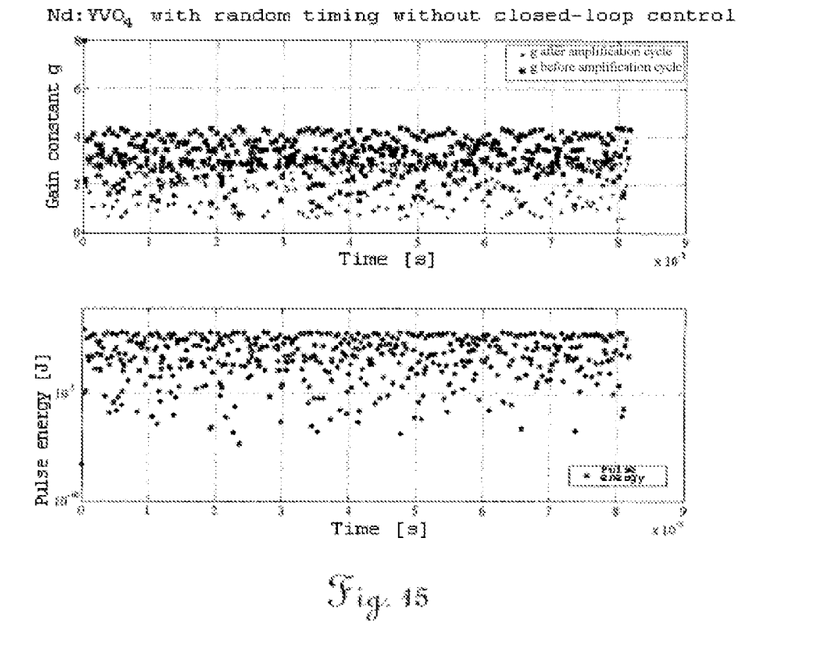
FIG. 15 shows gain constant and pulse energy for the fourth exemplary embodiment with random timing without closed-loop control according to the invention.
Figure 16:
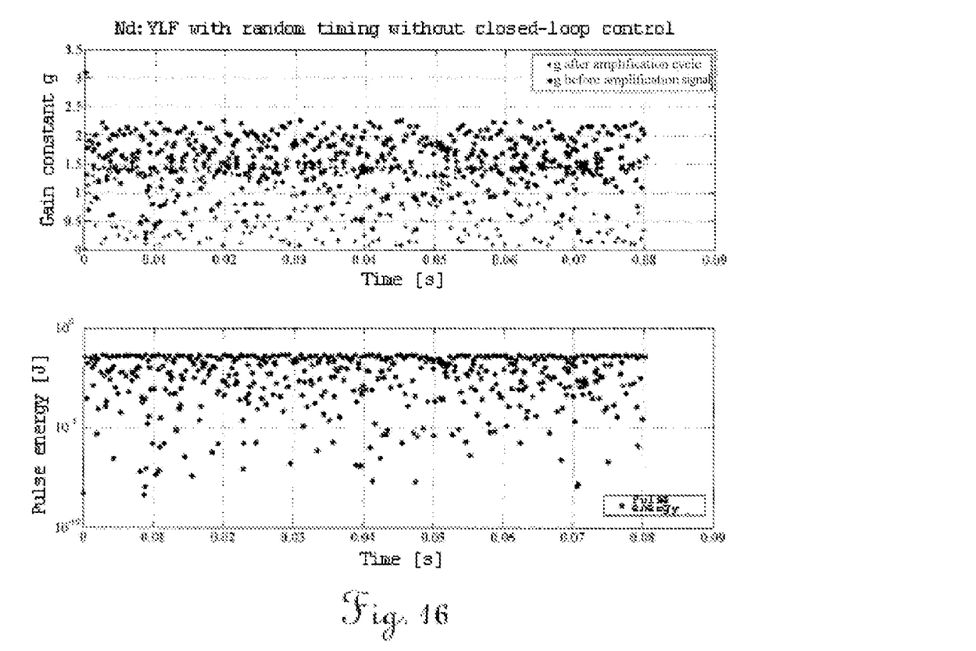
FIG. 16 shows gain constant and pulse energy for the fifth exemplary embodiment with random timing without closed-loop control according to the invention.

FIG. 15 and FIG. 16 show gain constant and pulse energy for the fourth example of an amplifier system with random timing without closed-loop control according to the invention.

As expected, both amplifiers react to a temporally arbitrary pulse interrogation sequence correspondingly chaotically.

Figure 17:
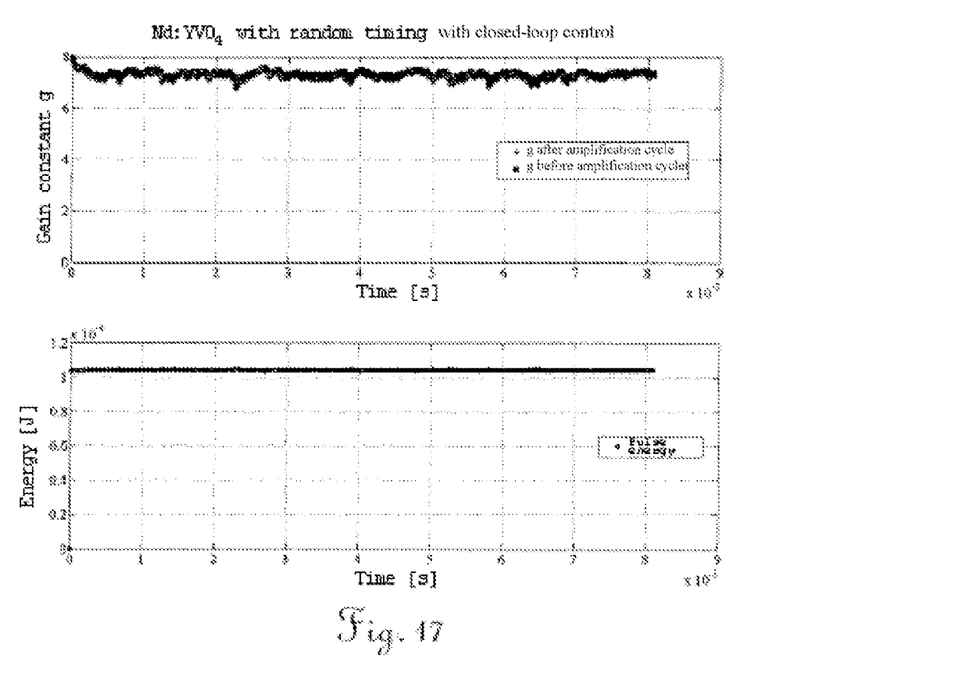
FIG. 17 shows gain constant and pulse energy for the fourth exemplary embodiment with random timing with closed-loop control according to the invention.

By contrast, the set energy of approximately 100 μJ is maintained very well in the case of closed-loop control according to the invention, as illustrated in FIG. 17 and FIG. 18. Only in the case of Nd:YVO$_4$ does a slight increase in the pulse noise arise. One development of the concept, this development being according to the invention, involves also making the desired value parameter x for the energy adjustable within the allowed limits, as a result of which a free choice of the pulse energy also becomes possible alongside the temporal "pulse-on-demand" function.

FIG. 19 shows the schematic illustration of a sixth exemplary embodiment of the laser amplification system according to the invention according to the principle of the recoverable amplifier with model-based calculation of the amplification. The laser arrangement corresponds to the third exemplary embodiment, in principle, but no fluorescence measuring arrangement is used. By contrast, upstream of the optical isolator 13 by means of a splitter mirror, part of the laser beam generated by the laser source 1 is coupled out and the pulse energy is measured as input energy by a first photodiode 6. In the same way, downstream of the optical isolator, the energy of the retrievable laser pulse S is measured by means of a second photodiode 6. The calculation of the crystal state is based on the numerical modeling of the crystal and is effected in accordance with the procedure elucidated in FIG. 4, but the contributions of the further components present in the resonator, such as e.g. the losses generated by the switching modulator 9, can also be taken into account and modeled. For further improvement of the model-based open-loop control, additional measurements of the pulse energy can also be performed at further positions in the beam path or in the resonator.

The described mechanism for suppressing pulse boosts is, in principle, independent of the embodiment of the gain medium. In particular, a realization of the described laser amplification system with the amplifying laser medium and/or other functional components in a fiber design can be realized according to the invention.

What is claimed is
1. A laser amplification system for generating on-demand retrievable laser pulses, comprising:
   a laser source;
   a laser medium for amplifying laser pulses generated by the laser source;
   a loss modulator, including means for modulating the amplification of the laser pulses by the laser medium by loss generation, such that the on demand retrievable laser pulses are provided with a predefined pulse time and/or pulse energy; and
   means for determining the respective instantaneous gain of the laser medium before an amplification process for one of the laser pulses the respective instantaneous gain of the laser medium; and
   means for controlling the loss generation by the loss modulator by closed-loop or open-loop control depending on the instantaneous gain of the laser medium.

2. The laser amplification system as claimed in claim 1, wherein the laser source is with a downstream pulse selector for the targeted selection of laser pulses to be amplified.

3. The laser amplification system as claimed in claim 2, further comprising:
   a measuring circuit, which measures the energies of the laser pulse before and after the amplification process.

4. The laser amplification system as claimed in claim 1, wherein the loss modulator includes a, acousto-or electro-optical loss modulator.

5. The laser amplification system as claimed in claim 1, further comprising an open-loop control component, which calculates the present state of the laser medium on the basis of a model for the state of the laser medium.

6. The laser amplification system as claimed in claim 1, further comprising
an open-loop control component, which calculates the present state of the laser medium on the basis of a numerical model for the state of the laser medium.

7. The laser amplification system as claimed in claim 1, wherein the loss generation is controlled by open-loop control with the aid of a loop-up table.

8. The laser amplification system as claimed in claim 1, further comprising:
a fluorescence measuring arrangement for determining the gain of the laser medium from a measurement of the fluorescence of the laser medium.

9. The laser amplification system as claimed in claim 1, further comprising:
a fluorescence measuring arrangement for determining the gain of the laser medium from a measurement of the fluorescence of the laser medium for the closed-loop control of the loss generation by a feedback signal representing the amplifier fluorescence.

10. The laser amplification system as claimed in claim 1, further comprising
a regenerative amplifier, including:
a laser resonator having at least one resonator minor, and
a switching arrangement having at least one polarizer.

11. The laser amplification system as claimed in claim 1, further comprising
a regenerative amplifier, including:
a laser resonator having at least one resonator minor, and
a switching arrangement having at least one polarizer including a thin-film polarizer; and a electro-optical switching modulator with an open-loop/closed-loop control electronic unit for the switching modulator and the loss modulator.

12. The laser amplification system as claimed in claim 1, further comprising a pulse compressor and a pulse stretcher.

13. The laser amplification system as claimed in claim 1, further comprising a nonlinear optical conversion stage.

14. The laser amplification system as claimed in claim 1, further comprising a nonlinear optical conversion stage for generating the second or third harmonic.

15. The laser amplification system as claimed in claim 1, wherein at least the amplifying laser medium is embodied in a fiber design.

16. A laser amplification method for generating on demand retrievable laser pulses having a predefined pulse time and/or pulse energy comprising:
a laser source;
a laser medium for amplifying laser pulses generated by the laser source;
a loss modulator; and
generating laser pulses to be amplified by means of the laser source with selection of the laser pulse from a multiplicity of generated pulses;
amplifying the laser pulse by means of the laser medium;
providing the amplified laser pulse as an on demand retrievable laser pulse;
wherein
the loss modulator modulates the amplification of the laser pulses by the laser medium by loss generation, such that the on demand retrievable laser pulses are provided with a predefined pulse time and/or pulse energy; and
before the amplification of the laser pulse the respective instantaneous gain of the laser medium is determined and the loss generation by the loss modulator is controlled by closed-loop or open-loop control depending on the instantaneous gain of the laser medium.

17. The laser amplification method as claimed in claim 16, wherein the loss modulator includes an acousto-or electro-optical loss modulator.

18. The laser amplification method as claimed in claim 16, wherein the instantaneous gain of the laser medium is calculated on the basis of a model for the state of the laser medium.

19. The laser amplification method as claimed in claim 16, wherein the instantaneous gain of the laser medium is determined by the numerical solution of the differential equations $$\frac{dg}{dt} = \frac{g_0 - g}{\tau_L} - \frac{gE}{E_{sat}T_R}$$

$$\frac{dE}{dt} = \frac{E}{T_R}(g - l_{para} - l_{mod})$$

wherein the following designations are applicable
g instantaneous gain,
$g_0$ small-signal gain constant,
$\tau_L$ lifetime of the upper laser level,
E pulse energy,
$E_{sat}$ saturation energy,
$T_R$ resonator circulation time,
$l_{para}$ parasitic loss constant,
$l_{mod}$ adjustable modulation loss.

20. The laser amplification method as claimed in claim 16, wherein the open-loop control of the loss generation is effected by means of a look-up table.

21. The laser amplification method as claimed in claim 16, wherein before and after the amplification process the energies of the laser pulse are measured and the model is adapted on the basis of matching calculated and actual instantaneous gain.

22. The laser amplification method as claimed in claim 16, wherein the instantaneous gain of the laser medium is determined by a measurement of the fluorescence of the laser medium, more particularly the closed-loop control of the loss generation is effected by a feedback signal representing the amplifier fluorescence.

* * * * *

UNITED STATES PATENT AND TRADEMARK OFFICE
CERTIFICATE OF CORRECTION

PATENT NO. : 8,582,614 B2
APPLICATION NO. : 13/576375
DATED : November 12, 2013
INVENTOR(S) : Meier et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 1, Line 9, delete "Nd:YV04" and insert -- $Nd:YVO_4$ --, therefor.

In the Specification

In Column 4, Line 48, delete "invention, and" and insert -- invention; and --, therefor.

In Column 6, Line 1, delete "is, in turn" and insert -- is in turn --, therefor.

In Column 7, Line 10, delete "minor 10" and insert -- mirror 10 --, therefor.

In Column 7, Line 29, delete "minor" and insert -- mirror --, therefor.

In Column 7, Line 67, delete "signal, VF" and insert -- signal VF --, therefor.

In Column 10, Line 5, delete "parameter x" and insert -- parameter κ --, therefor.

In the Claims

In Column 11, Line 11, in Claim 7, delete "loop-up" and insert -- look-up --, therefor.

In Column 11, Line 28, in Claim 10, delete "minor," and insert -- mirror, --, therefor.

In Column 11, Line 33, in Claim 11, delete "minor," and insert -- mirror, --, therefor.

Signed and Sealed this
Third Day of June, 2014

Michelle K. Lee
*Deputy Director of the United States Patent and Trademark Office*